United States Patent
Billich

(10) Patent No.: US 12,497,915 B2
(45) Date of Patent: Dec. 16, 2025

(54) METHOD FOR OPERATING A VEHICLE COOLING SYSTEM

(71) Applicant: DEERE & COMPANY, Moline, IL (US)

(72) Inventor: Manuel Billich, Dornstadt (DE)

(73) Assignee: Deere & Company, Moline, IL (US)

( * ) Notice: Subject to any disclaimer, the term of this patent is extended or adjusted under 35 U.S.C. 154(b) by 179 days.

(21) Appl. No.: 18/444,919

(22) Filed: Feb. 19, 2024

(65) Prior Publication Data
US 2024/0295187 A1 Sep. 5, 2024

(30) Foreign Application Priority Data

Mar. 1, 2023 (DE) .......................... 102023105066.4

(51) Int. Cl.
*F01P 1/06* (2006.01)
*B60K 11/02* (2006.01)
(Continued)

(52) U.S. Cl.
CPC ................ *F01P 1/06* (2013.01); *B60K 11/02* (2013.01); *F01P 3/18* (2013.01); *F01P 5/06* (2013.01); *F01P 7/04* (2013.01); *F01P 7/08* (2013.01); *F01P 11/10* (2013.01); *F01P 2003/185* (2013.01); *F01P 2003/187* (2013.01); *F01P 2005/105* (2013.01)

(58) Field of Classification Search
CPC ..... B60K 11/02; F01P 1/06; F01P 3/18; F01P 5/06; F01P 7/04; F01P 7/08; F01P 11/10; F01P 2003/185; F01P 2003/187; F01P 2005/10
See application file for complete search history.

(56) References Cited

U.S. PATENT DOCUMENTS 10,479,191 B2 * 11/2019 Ivey ........................ B60K 11/04
10,823,041 B2 * 11/2020 Dionne .................. B64D 27/08
(Continued)

FOREIGN PATENT DOCUMENTS

DE         19910651 A1 *  9/1999 ............. F01P 7/048
DE     102013000813 A1 *  7/2014 ............. B60K 11/08
(Continued)

OTHER PUBLICATIONS

Extended European Search Report and Written Opinion issued in European Patent Application No. 24154374.3 dated Sep. 3, 2024, in 10 pages.

*Primary Examiner* — Ljiljana V. Ciric

(57) ABSTRACT

A method for operating a vehicle cooling system includes generating, via a main cooling unit, a main cooling air flow passing through a first heat exchanger arrangement in a main cooling path; generating, via a secondary cooling unit, located upstream in the main cooling path, a secondary cooling air flow passing through a second heat exchanger arrangement in a secondary cooling path branching off upstream in the main cooling path; in a first operating mode, operating, via a control unit, both the main cooling unit and the secondary cooling unit in order to generate mutually independent cooling air flows; and, in a second operating mode, operating, via the control unit, the main cooling unit and setting the secondary cooling unit to one of a stationary and an idle operating state.

10 Claims, 2 Drawing Sheets

(51) Int. Cl.
    *F01P 3/18*     (2006.01)
    *F01P 5/06*     (2006.01)
    *F01P 5/10*     (2006.01)
    *F01P 7/04*     (2006.01)
    *F01P 7/08*     (2006.01)
    *F01P 11/10*     (2006.01)

(56) References Cited

U.S. PATENT DOCUMENTS

| | | | |
|---|---|---|---|
| 12,025,048 B2 * | 7/2024 | Billich | F01P 3/18 |
| 2019/0184811 A1 * | 6/2019 | Ivey | B60S 1/62 |
| 2023/0304433 A1 * | 9/2023 | Billich | F01P 3/18 |
| 2024/0295187 A1 * | 9/2024 | Billich | F01P 5/06 |

FOREIGN PATENT DOCUMENTS

| | | | | |
|---|---|---|---|---|
| DE | 102014208545 A1 * | 11/2015 | | F01P 3/18 |
| DE | 102019204468 A1 * | 10/2020 | | F01P 3/20 |
| DE | 102021127498 A1 * | 4/2023 | | F28D 1/0443 |
| DE | 102022106777 A1 * | 9/2023 | | F01P 7/06 |
| EP | 2757233 A1 | 7/2014 | | |
| EP | 4170270 A1 * | 4/2023 | | F28D 1/0417 |
| EP | 4257809 A1 | 10/2023 | | |
| EP | 3726955 B1 * | 4/2024 | | A01D 41/1252 |
| FR | 3093303 A1 * | 9/2020 | | F01P 3/18 |
| JP | H02133233 A * | 5/1990 | | F01P 11/06 |
| WO | WO-2017123131 A1 * | 7/2017 | | B60K 1/00 |
| WO | WO-2020045312 A1 * | 3/2020 | | F01P 3/18 |

\* cited by examiner

METHOD FOR OPERATING A VEHICLE COOLING SYSTEM

CROSS-REFERENCE TO RELATED APPLICATIONS

This application claims priority to German Patent Application No. 102023105066.4, filed Mar. 1, 2023, which is hereby incorporated by reference.

FIELD OF THE DISCLOSURE

The disclosure relates to a method for operating a vehicle cooling system.

BACKGROUND

Agricultural or industrial utility vehicles can have a cooling system for cooling an internal combustion engine.

SUMMARY

A vehicle cooling system comprises an axial fan, which can be set in rotation by a diesel engine via a belt drive and by means of which air is sucked from the external environment through a front grille of an engine cover in order to generate a main cooling air flow passing through a heat exchanger stack. The heat exchanger stack contains, inter alia, an engine cooler, an oil cooler, and an air-conditioning condenser of a vehicle air-conditioning system, these being arranged adjacent to one another or in succession in the main cooling air flow. Located upstream, in an upper edge region of the main cooling air flow, there is a further axial fan. A separate drive in the form of a hydraulic or electric motor is associated with the further axial fan and serves for independently generating a secondary cooling air flow branching off substantially perpendicularly upwards from the main cooling air flow. The secondary cooling air flow generated in such a way is conducted through a charge air cooler of the diesel engine and is subsequently discharged into the external environment at a top side of the engine cover of the agricultural tractor.

A trait of the known vehicle cooling system is that the operation of the two axial fans via mutually separate drives is comparatively inefficient, especially in the case of a moderate cooling requirement in the low load range of the agricultural tractor.

The object of the present disclosure, therefore, is to optimize a method of the type mentioned at the outset with regard to energy-efficient operation of a vehicle cooling system distributed over multiple cooling paths.

This object is achieved by a method for operating a vehicle cooling system having the features of one or more of the following embodiments.

In a method for operating a vehicle cooling system, the vehicle cooling system has a main cooling path and a secondary cooling path branching off upstream in the main cooling path, a main cooling unit for generating a main cooling air flow passing through a first heat exchanger arrangement being associated with the main cooling path and a secondary cooling unit, located upstream in the main cooling path, for generating a secondary cooling air flow passing through a second heat exchanger arrangement being associated with the secondary cooling path. In a first operating mode, both the main cooling unit and the secondary cooling unit here are operated by a control unit (e.g., a controller including a processor and memory) in order to generate mutually independent cooling air flows, whereas, in a second operating mode, only the main cooling unit is operated via the control unit or the secondary cooling unit is set to an idle operating state so that, due to the pressure conditions prevailing upstream in the main cooling air flow, a passive secondary cooling air flow passing through the second heat exchanger arrangement is produced.

The first operating mode here corresponds to a conventional operation of the two cooling units with active generation of both the main and the secondary cooling air flow, whereas, in the second operating mode, the secondary cooling unit is deliberately taken out of operation or is in an idle operating state so that the power consumption is substantially limited to the operation of the main cooling unit. This takes into account circumstances in which the cooling requirement of the second heat exchanger arrangement is so low that the generation of a passive secondary cooling air flow passing through the second heat exchanger in the reverse direction is sufficient for the purpose of adequate heat dissipation. By selecting the first or second operating mode according to requirements, the distributed vehicle cooling system can therefore be operated in a particularly energy efficient manner.

The cooling units typically each comprise an axial fan, which, in the case of the main cooling unit, is set in rotation via a belt drive of a diesel engine of the agricultural tractor and, in the case of the secondary cooling unit, is set in rotation by means of a separate hydraulic or electric motor.

For the idle operating state provided in the second operating mode, this means that a fan speed in the range of 10 to 15 revolutions per minute is typically selected. Selecting such a low fan speed ensures that the passive secondary cooling air flow remains uninfluenced in the idle operating state, although it is clear from the rotating fan blades of the axial fan that the vehicle cooling system is currently in operation and therefore poses a potential injury risk, in particular when the engine cover is open.

For the sake of completeness, it should be noted that the term "cooling path" is used abstractly here and denotes the path which stipulates or specifies the course of the respective cooling air flow, regardless of whether or not such a cooling air flow is currently present.

Advantageous developments of the method according to the disclosure are shown in one or more of the following embodiments.

The first or second operating mode is selected according to an ascertainment of the current cooling requirement of the second heat exchanger arrangement which is determined via the control unit.

According to some embodiments, for reasons of energy efficiency, the control unit always prioritizes the second operating mode. However, in a departure from this, the first operating mode is selected if the control unit, on the basis of the ascertained cooling requirement, detects that the cooling power which can be achieved through the generation of the passive secondary cooling air flow is not sufficient to reliably meet the cooling requirement of the second heat exchanger arrangement. The same applies if it is detected via the control unit that the full power of the main cooling unit is required for adequate cooling of the first heat exchanger arrangement.

In this regard, therefore, during the selection of the operating mode via the control unit, the ascertained cooling requirement of the first heat exchanger arrangement is also considered.

In order to ascertain the current cooling requirement, the temperature conditions which are recorded using sensors in the respective cooling circuits of the heat exchanger arrangements may be correlated with the external temperature via the control unit. To record the temperature conditions prevailing in the cooling circuits and also the external temperature using sensors, a corresponding number of temperature sensors is provided, whereof the sensor data are supplied to the control unit via an on-board CAN data bus or a comparable data transfer interface.

Furthermore, in the second operating mode, there is the option of increasing the intensity of the main cooling air flow via the control unit by activating the main cooling unit in particular according to an ascertained cooling requirement for the first heat exchanger arrangement. By increasing the cooling power of the main cooling unit accordingly, it is possible, amongst other things, to prevent the cooling of the first heat exchanger arrangement from being impaired due to the waste heat of the second heat exchanger arrangement, which additionally enters the main cooling air flow via the passive secondary cooling air flow when the secondary cooling unit is taken out of operation or is in the idle operating state.

The above and other features will become apparent from the following detailed description and accompanying drawings.

BRIEF DESCRIPTION OF THE DRAWINGS

The method according to the disclosure for operating a vehicle cooling system is described in more detail below with the aid of the drawings. In these, identical reference signs denote corresponding components or components which are comparable in terms of their function.

DETAILED DESCRIPTION

The embodiments or implementations disclosed in the above drawings and the following detailed description are not intended to be exhaustive or to limit the present disclosure to these embodiments or implementations.

Figure 1:
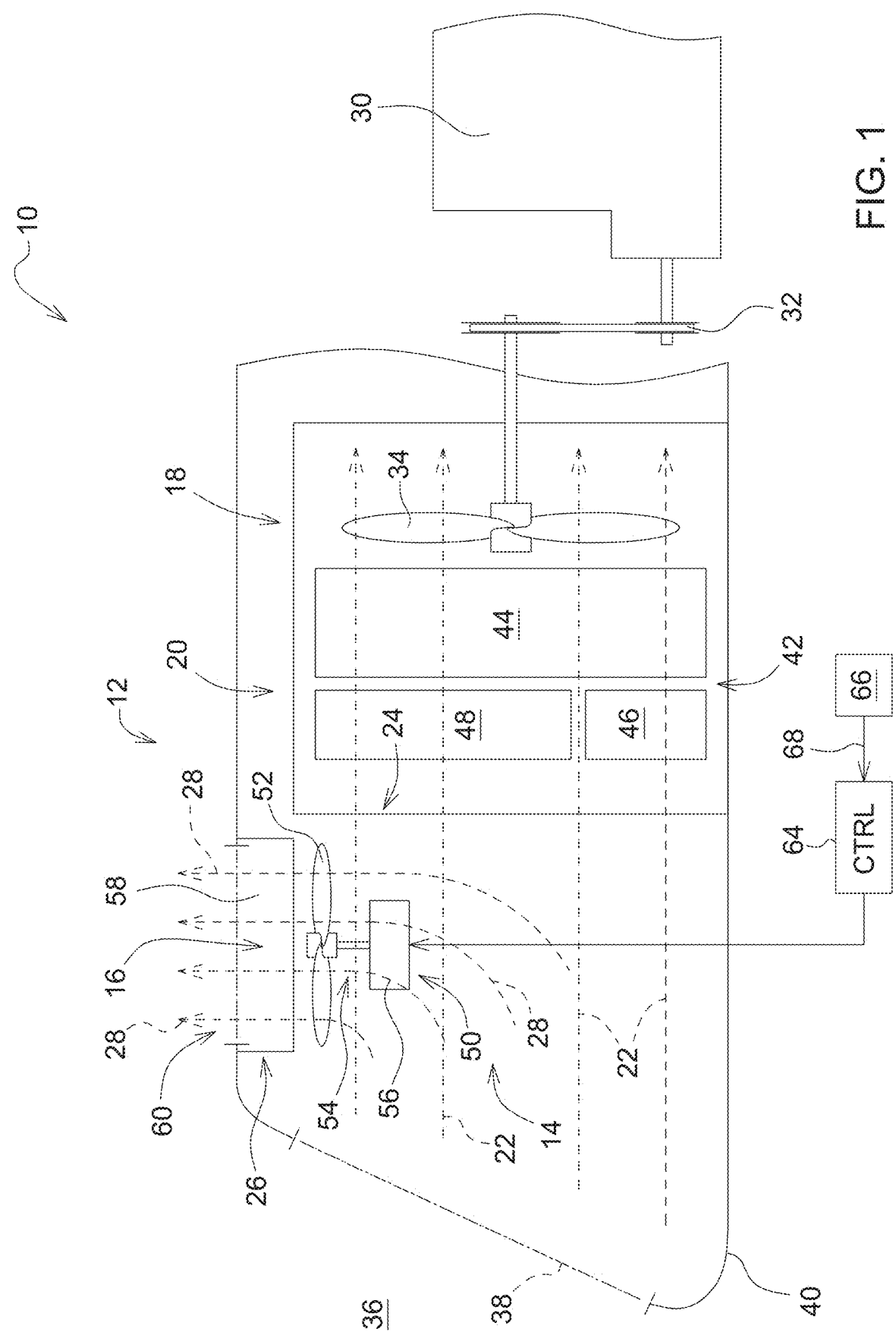
FIG. 1 shows a schematically illustrated exemplary embodiment of a vehicle cooling system of an agricultural tractor in a first operating mode, which vehicle cooling system is distributed over multiple cooling paths.

FIG. 1 shows, in a schematic illustration, an exemplary embodiment of a vehicle cooling system distributed over multiple cooling paths.

The vehicle cooling system 12, which is accommodated in an agricultural tractor 10 (not shown in more detail), has a main cooling path 14 and a secondary cooling path 16 branching off upstream in the main cooling path 14, a main cooling unit 18 for generating a main cooling air flow 22 passing through a first heat exchanger arrangement 20 being associated with the main cooling path 14 and a secondary cooling unit 24, located upstream in the main cooling path 14, for generating a secondary cooling air flow 28 passing through a second heat exchanger arrangement 26 being associated with the secondary cooling path 16.

According to the example, the main cooling unit 18 comprises an axial fan 34, which can be set in rotation by a diesel engine 30 of the agricultural tractor 10 via a belt drive 32 and by means of which air is sucked from the external environment 36 through a front grille 38 of an engine cover 40 in order to generate the main cooling air flow 22 passing through the first heat exchanger arrangement 20. The first heat exchanger arrangement 20, which is designed as a heat exchanger stack 42, contains, inter alia, an engine cooler 44, an oil cooler 46 and an air-conditioning condenser 48 of a vehicle air-conditioning system, these being arranged adjacent to one another or in succession in the main cooling air flow 22.

According to the example, in relation to the direction of the main cooling air flow 22, the axial fan 32 is located behind the heat exchanger stack 42, although it may also be arranged in front of it.

The secondary cooling unit 24 is a further axial fan 52 located upstream in an upper edge region 50 of the main cooling air flow 22. A separate drive 54 in the form of a hydraulic or electric motor 56 is associated with the further axial fan 52 and serves for independently generating the secondary cooling air flow 28 branching off substantially perpendicularly upwards from the main cooling air flow 22. According to a first operating mode (presented in FIG. 1) of the vehicle cooling system 12, the secondary cooling air flow 28 generated by means of the further axial fan 52 is conducted through a charge air cooler 58 of the diesel engine 30—which charge air cooler is comprised by the second heat exchanger arrangement 26—and is subsequently discharged into the external environment 36 at a top side 60 of the engine cover 40 of the agricultural tractor 10.

In the present case, in relation to the direction of the secondary cooling air flow 28, the further axial fan 52 is located in front of the heat exchanger stack 26, although it may also be arranged behind it.

For example, in the first operating mode, the axial fans 34, 52 both of the main cooling unit 18 and of the secondary cooling unit 24 are operated such that mutually independent cooling air flows 22, 28 are generated, whereas, in a second operating mode (presented in FIG. 2), only the axial fan 34 of the main cooling unit 18 is in operation. In the second operating mode, the further axial fan 52 of the secondary cooling unit 24 is stationary or is set to an idle operating state in which it has only a low fan speed in the range of 10 to 15 revolutions per minute so that, due to the pressure conditions prevailing upstream in the main cooling air flow (which cause a negative pressure to develop), a passive secondary cooling air flow 62, which passes through the second heat exchanger arrangement 26 in the reverse direction or is sucked from the external environment, is produced.

A control unit 64 (e.g., a controller including a processor and memory) coordinates the operation of the cooling units 18, 24 by switching between the two operating modes. The first or second operating mode here is selected according to an ascertainment of the current cooling requirement of the two heat exchanger arrangements 20, 26 which is determined by the control unit 64, for which the temperature conditions recorded using sensors in the respective cooling circuits of the heat exchanger arrangements 20, 26 are correlated with the external temperature.

To record the temperature conditions prevailing in the cooling circuits and also the external temperature using sensors, a corresponding number of temperature sensors 66 is provided, whereof the sensor data is supplied to the control unit 64 via an on-board CAN data bus 68.

Figure 2:
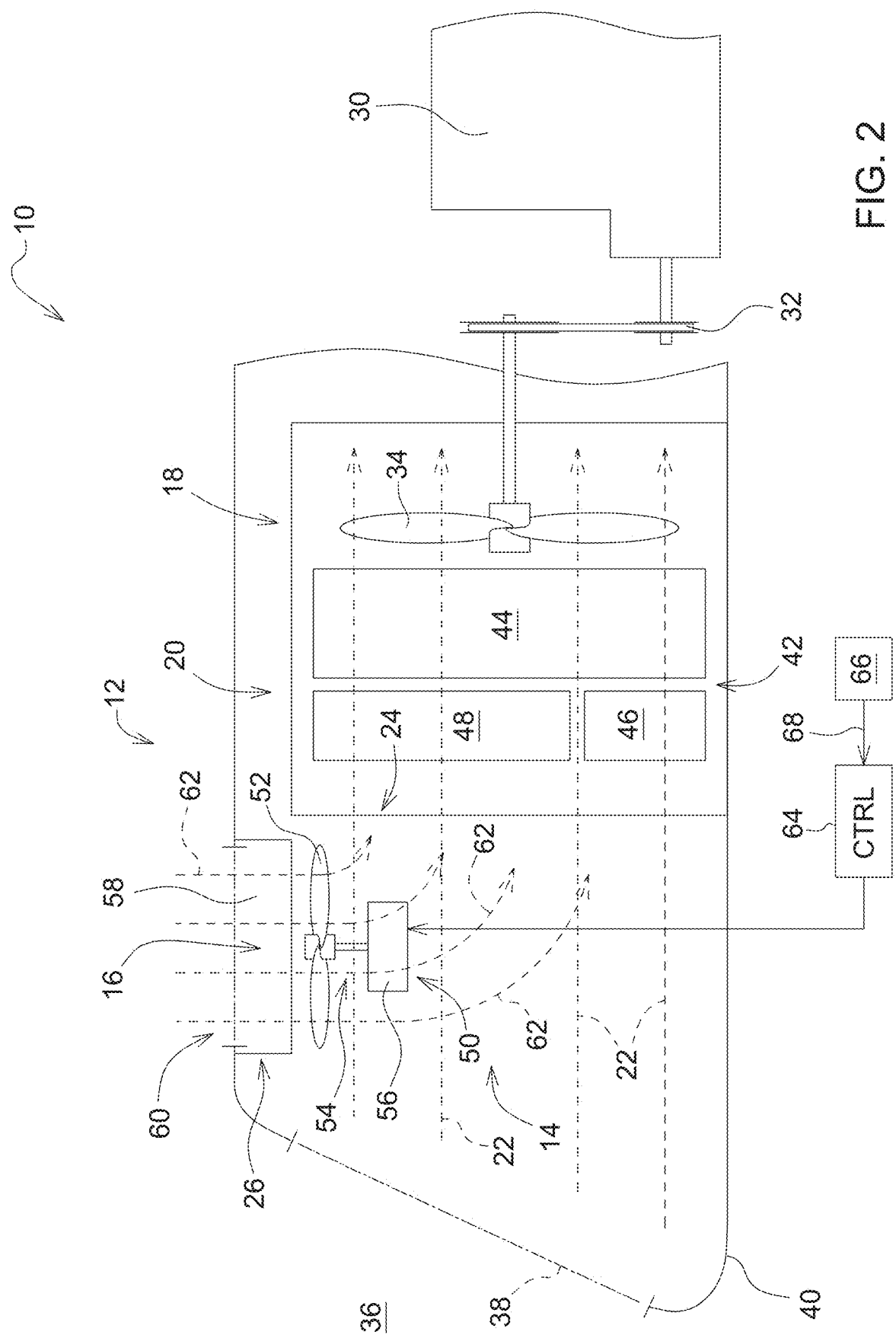
FIG. 2 shows the vehicle cooling system presented in FIG. 1 in a second operating mode.

In some embodiments, for reasons of energy efficiency, the control unit 64 always prioritizes the second operating mode (shown in FIG. 2). However, in a departure from this, the first operating mode is selected if the control unit 64, on the basis of the ascertained cooling requirement, detects that the cooling power which can be achieved through the generation of the passive secondary cooling flow 62 is not sufficient to reliably meet the cooling requirement of the second heat exchanger arrangement 26. The same applies if it is detected by the control unit 64 that the full power of the main cooling unit 18 is required for adequate cooling of the first heat exchanger arrangement 20. In this regard, therefore, during the selection of the operating mode by the control unit 64, the ascertained cooling requirement of the first heat exchanger arrangement 20 is also considered.

If switching to the second operating mode takes place, the intensity of the main cooling air flow 22 is increased via the control unit 64, possibly by activating the main cooling unit 18 according to the ascertained cooling requirement for the first heat exchanger arrangement 20. By increasing the cooling power of the main cooling unit 18 accordingly, it is possible, amongst other things, to prevent the cooling of the first heat exchanger arrangement 20 from being impaired due to the waste heat of the second heat exchanger arrangement 26, which additionally enters the main cooling air flow 22 via the passive secondary cooling air flow 62 when the secondary cooling unit 24 is taken out of operation or is in the idle operating state.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A method for operating a vehicle cooling system, comprising:
    generating, via a main cooling unit, a main cooling air flow passing through a first heat exchanger arrangement in a main cooling path;
    generating, via a secondary cooling unit located upstream in the main cooling path, a secondary cooling air flow passing through a second heat exchanger arrangement in a secondary cooling path branching off upstream in the main cooling path;
    in a first operating mode, operating via a control unit both the main cooling unit and the secondary cooling unit in order to generate mutually independent cooling air flows; and
    in a second operating mode, operating via the control unit the main cooling unit and setting the secondary cooling unit to one of a stationary and an idle operating state so that, due to the pressure conditions prevailing upstream in the main cooling air flow, a passive secondary cooling air flow passing through the second heat exchanger arrangement is produced.

2. The method of claim 1, wherein the first or second operating mode is selected by ascertaining the current cooling requirement of the second heat exchanger arrangement via the control unit.

3. The method of claim 2, wherein, during the selection of the operating mode via the control unit, also ascertaining an ascertained cooling requirement of the first heat exchanger arrangement.

4. The method of claim 3, wherein, for ascertaining the current cooling requirement of the second heat exchanger and the ascertained cooling requirement of the first heat exchanger arrangement via the control unit, the temperature conditions recorded using sensors in the respective cooling circuits of the first and second heat exchanger arrangements are correlated with the external temperature.

5. The method of claim 1, wherein, in the second operating mode, the intensity of the main cooling air flow is increased by activating the main cooling unit via the control unit.

6. A vehicle cooling system, comprising:
    a main cooling path and a secondary cooling path branching off upstream in the main cooling path;
    a main cooling unit for generating a main cooling air flow passing through a first heat exchanger arrangement in the main cooling path and a secondary cooling unit, located upstream in the main cooling path, for generating a secondary cooling air flow passing through a second heat exchanger arrangement in the secondary cooling path;
    a control unit configured to be operable in a first operating mode, whereby both the main cooling unit and the secondary cooling unit are operated by the control unit to generate mutually independent air flows; and, also configured to be operable in a second operating mode, whereby the main cooling unit is operated by the control unit and the secondary cooling unit is in one of a stationary and an idle operating state so that, due to the pressure conditions prevailing upstream in the main cooling air flow, a passive secondary cooling air flow passing through the second heat exchanger arrangement is produced.

7. The vehicle cooling system of claim 6, wherein the first or second operating mode is selected by ascertaining the current cooling requirement of the second heat exchanger arrangement via the control unit.

8. The vehicle cooling system of claim 7, wherein, during the selection of the operating mode via the control unit, also ascertaining an ascertained cooling requirement of the first heat exchanger arrangement.

9. The vehicle cooling system of claim 8, wherein, for ascertaining the current cooling requirement of the second heat exchanger and the ascertained cooling requirement of the first heat exchanger arrangement via the control unit, the temperature conditions recorded using sensors in the respective cooling circuits of the first and second heat exchanger arrangements are correlated with the external temperature.

10. The vehicle cooling system of claim 6, wherein, in the second operating mode, the intensity of the main cooling air flow is increased by activating the main cooling unit via the control unit.

* * * * *